(12) United States Patent
Hwang et al.

(10) Patent No.: US 9,947,956 B2
(45) Date of Patent: Apr. 17, 2018

(54) SYSTEM FOR ROLLING ELECTRODE PLATES

(71) Applicant: SAMSUNG SDI CO., LTD., Yongin-si, Gyeonggi-do (KR)

(72) Inventors: Soonhak Hwang, Yongin-si (KR); Gibong Cho, Yongin-si (KR); Dongwoo Kim, Yongin-si (KR); Seunghwan Lee, Yongin-si (KR); Jinuk Hong, Yongin-si (KR); Kyuho Kim, Yongin-si (KR); Kyungtaek Choi, Yongin-si (KR); Sangjin Maeng, Yongin-si (KR); Jungki Min, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 282 days.

(21) Appl. No.: 14/975,533

(22) Filed: Dec. 18, 2015

(65) Prior Publication Data

US 2016/0372779 A1  Dec. 22, 2016

(30) Foreign Application Priority Data

Jun. 19, 2015 (KR) .................. 10-2015-0087441

(51) Int. Cl.
*H01M 10/04* (2006.01)
*B21B 1/40* (2006.01)
(Continued)

(52) U.S. Cl.
CPC .............................. *H01M 10/0409* (2013.01)

(58) Field of Classification Search
CPC combination set(s) only.
See application file for complete search history.

(56) References Cited

U.S. PATENT DOCUMENTS 4,609,597 A * 9/1986 Plasse .................. H01M 2/12
429/122
8,870,977 B2 * 10/2014 Lee .................... H01M 2/16
29/623.1
(Continued)

FOREIGN PATENT DOCUMENTS

KR      10-0696811 B1    3/2007
KR    10-2013-0095368 A   8/2013
KR    10-2013-0105001 A   9/2013

*Primary Examiner* — Kaity Chandler
(74) *Attorney, Agent, or Firm* — Lewis Roca Rothgerber Christie LLP

(57) ABSTRACT

A system for rolling electrode plates includes: supplying units for supplying first and second electrode plates and separators; electrode processing units for forming first electrode tabs having gradually increasing intervals between tabs on one side of the first electrode plate and second electrode tabs having gradually increasing intervals between tabs on one side of the second electrode plate by performing cutting processes on the sides of the first and second electrode plates; an assembling unit for forming an electrode assembly by rolling the first and second electrode plates and the separators; and buffer units for temporarily storing the first and second electrode plates to compensate for differences in processing rates and base material transfer amounts between the electrode processing units and the assembling unit, and for transmitting the temporarily stored first and second electrode plates to the assembling unit.

9 Claims, 5 Drawing Sheets

(51) Int. Cl.
*B21B 38/04* (2006.01)
*H01M 4/04* (2006.01)

(56) References Cited

U.S. PATENT DOCUMENTS

| | | | | |
|---|---|---|---|---|
| 9,142,826 B1* | 9/2015 | Wang | ...................... | H01M 2/34 |
| 9,263,726 B2* | 2/2016 | Seo | ...................... | H01M 2/263 |
| 2010/0081042 A1* | 4/2010 | Morishima | ........... | H01M 2/263 |
| | | | | 429/94 |
| 2010/0081052 A1* | 4/2010 | Morishima | ........... | H01M 2/263 |
| | | | | 429/211 |
| 2010/0124694 A1* | 5/2010 | Hikata | .................... | B26F 1/384 |
| | | | | 429/94 |
| 2013/0059183 A1* | 3/2013 | Ahn | .................... | H01M 2/0217 |
| | | | | 429/94 |
| 2013/0309566 A1* | 11/2013 | Umehara | ................ | H01M 4/13 |
| | | | | 429/211 |
| 2014/0026399 A1* | 1/2014 | Yuhara | .............. | H01M 10/0404 |
| | | | | 29/623.1 |
| 2014/0050957 A1* | 2/2014 | Yang | ................ | H01M 10/0459 |
| | | | | 429/94 |
| 2014/0193710 A1* | 7/2014 | Hasegawa | ............... | H01M 2/26 |
| | | | | 429/211 |
| 2014/0227583 A1* | 8/2014 | Do | .................... | H01M 10/0431 |
| | | | | 429/162 |
| 2014/0342225 A1* | 11/2014 | Isshiki | ................. | H01M 4/139 |
| | | | | 429/217 |
| 2016/0036085 A1* | 2/2016 | Choi | ................ | H01M 10/0409 |
| | | | | 242/530 |

\* cited by examiner

FIG. 2A
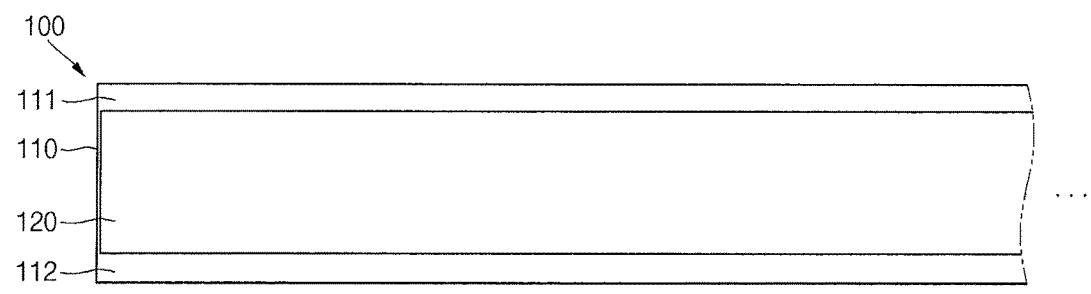
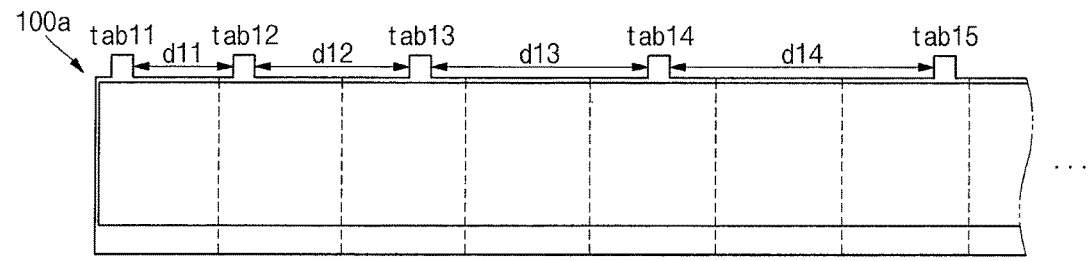
FIG. 2B

FIG. 3A
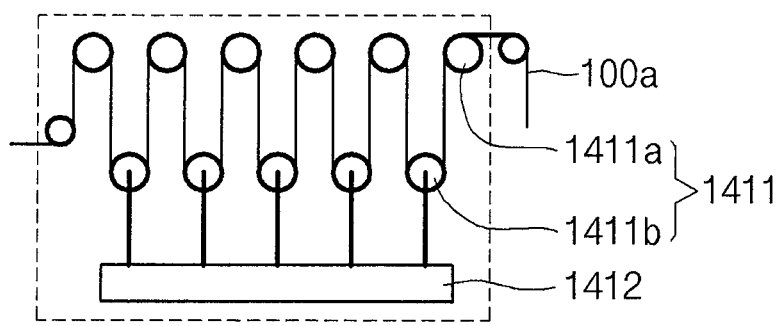
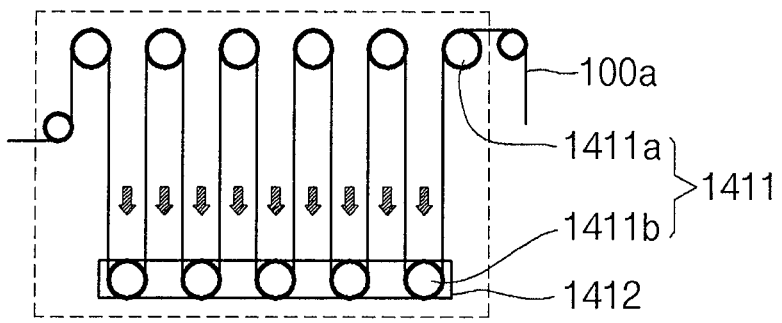
FIG. 3B

FIG. 4A
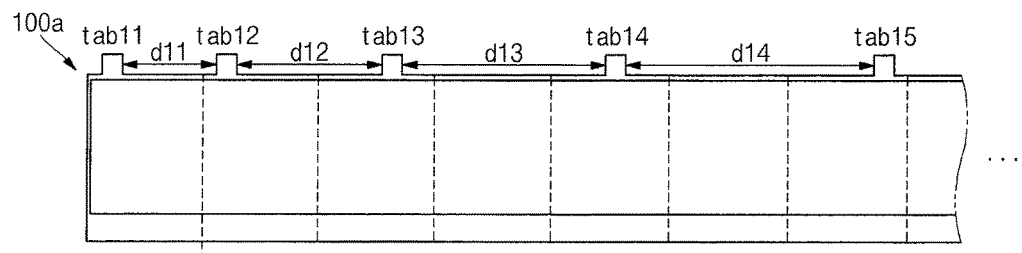
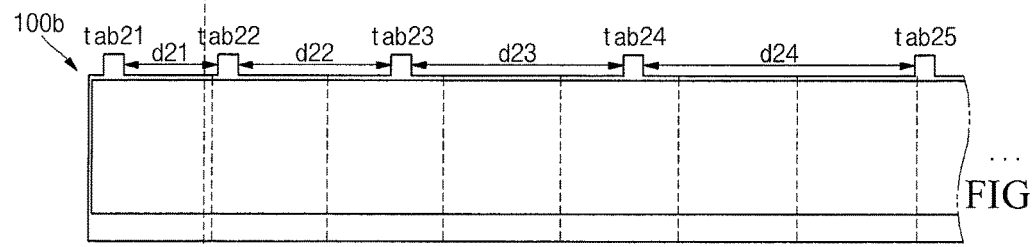
FIG. 4B
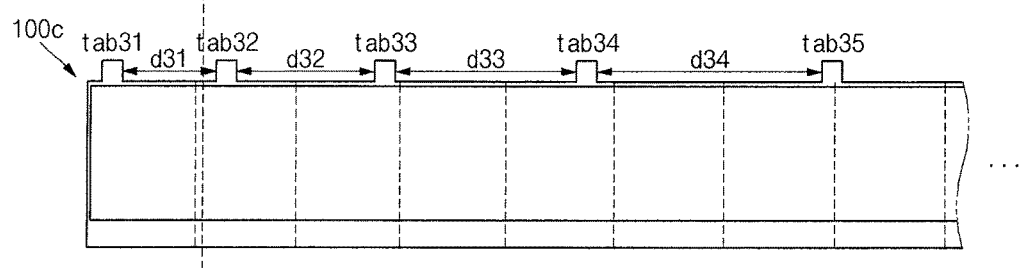
FIG. 4C

SYSTEM FOR ROLLING ELECTRODE PLATES

CROSS-REFERENCE TO RELATED APPLICATION

This application claims priority to and the benefit of Korean Patent Application No. 10-2015-0087441, filed on Jun. 19, 2015 in the Korean Intellectual Property Office, the entire content of which is herein incorporated by reference.

BACKGROUND

1. Field

Aspects of embodiments of the present invention relate to a system for rolling electrode plates.

2. Description of the Related Art

Batteries, such as lithium ion polymer batteries, are manufactured in various shapes, including, for example, cylindrical, prismatic, and pouch. The shapes of the batteries may be determined according to factors such as the shapes of corresponding products employing the batteries. For example, batteries for use in automobiles may require high-capacity, high-output characteristics, and may include an electrode assembly and an electrolyte accommodated in a prismatic can.

In order to manufacture a high-capacity battery, it may be desired to wind as many electrode plates as possible into a can having a given volume. In addition, in order to increase amounts of active materials coated on the electrode plates, it may be desired to reduce the volume occupied by current collectors in the can. However, since current collecting efficiency should be maintained to manufacture a high-output battery, the battery may be manufactured by forming electrode tabs on the electrode plates at regular intervals, such as every turn, level, or winding of the electrode assembly. Each such turn, level, or winding of the electrode assembly may then have its corresponding tabs for connecting to the current collectors of the electrode plate in consistent locations so that the tabs line up in the electrode assembly. The thus manufactured electrode assembly is referred to as a multi-tab electrode assembly.

The multi-tab electrode assembly may be manufactured by rolling a positive electrode plate and a second electrode plate with separators interposed therebetween using a rolling apparatus to prevent the positive electrode plate and the negative electrode plate from being electrically short-circuited. In addition, a notching apparatus may be employed to form an electrode tab having a particular shape on each of the positive electrode plate and the negative electrode plate.

The notching apparatus may include an unwinder, a punch, and a winder, and may punch a base material (of the electrode plates) supplied in a reel to a desired shape. The notching apparatus may then wind the punched base material into a reel to deliver to a subsequent process stage.

As described above, the notching apparatus and the rolling apparatus may be required to manufacture the multi-tab electrode assembly. First, for both the positive electrode plate and the negative electrode plate, a reel having a corresponding base material wound thereon is installed on the unwinder of the notching apparatus, and the base material is then supplied to the punch to form the electrode tab of the desired shape on each of the positive electrode plate and the negative electrode plate. This may be followed by rolling the formed electrode tabs in a reel using the winder for the positive electrode plate and for the negative electrode plate. The thus formed reels are transferred to the rolling apparatus, and the rolling apparatus rolls the positive electrode plate and the negative electrode plate each having the electrode tabs having a particular shape together with the separators to manufacture the multi-tab electrode assembly.

As described above, the electrode tabs are formed by the notching apparatus and the electrode assembly is rolled by the rolling apparatus. Therefore, in manufacturing a multi-tab electrode assembly, it may be quite difficult to properly align the positive or negative electrode tabs. In addition, when the electrode tabs are misaligned (as may be detected, for example, in the winder), it may be necessary to correct the misalignment of the electrode tabs, such as by modifying notching intervals of the notching apparatus. It may be necessary to check again whether the electrode tabs are properly aligned (such as in the winder), which may be quite a cumbersome process. Accordingly, it may take a long time to form high-quality electrode tabs and a considerable amount of base materials may be consumed.

In addition, if thicknesses of positive and negative electrode plates vary, the electrode tabs may get out of alignment, and the alignment of the electrode tabs may need to be corrected again. Further, in order to manufacture the multi-tab electrode assembly as described, two kinds of apparatuses may be required, which may increase the area for installing the apparatuses and may increase investment costs for the apparatuses.

SUMMARY

Embodiments of the present invention provide for a system for rolling electrode plates. Further embodiments provide for a system for rolling electrode plates that performs a notching process and a rolling process in a continuous mode (or batch mode) and can improve alignment of multi-tab electrode assemblies by adjusting intervals between each of the electrode tabs according to thickness changes of the electrode plates. The above and other aspects of the present invention will be described in or be apparent from the following description of example embodiments.

In an embodiment of the present invention, a system for rolling electrode plates is provided. The system includes: supplying units configured to supply a first electrode plate, a second electrode plate, and separators; electrode processing units configured to form a plurality of first electrode tabs having gradually increasing intervals between them on a first side of the first electrode plate and a plurality of second electrode tabs having gradually increasing intervals between them on a first side of the second electrode plate by performing cutting processes on the first sides of the first and second electrode plates supplied from the supplying units; an assembling unit configured to form an electrode assembly by rolling the first and second electrode plates cut by the electrode processing units and the separators supplied from the supplying units; and buffer units configured to temporarily store the first and second electrode plates cut by the electrode processing units to compensate for differences in processing rates and base material transfer amounts between the electrode processing units and the assembling unit, and transmit the temporarily stored first and second electrode plates to the assembling unit.

The electrode processing units may be further configured to perform the cutting processes by mold notching or laser notching.

The system may further include opposed sensor units installed at exit ports of the electrode processing units and configured to sense intervals between each of the first electrode tabs and intervals between each of the second electrode tabs.

The electrode processing units may be further configured to receive data sensed by the opposed sensor units and to perform the cutting processes to adjust the gradually increasing intervals between each of the first electrode tabs and the gradually increasing intervals between each of the second electrode tabs.

The electrode processing units may be further configured to perform the cutting processes to adjust the gradually increasing intervals between each of the first electrode tabs and the gradually increasing intervals between each of the second electrode tabs according to thickness changes of the first electrode plate and the second electrode plate.

When a thickness of the first electrode plate or the second electrode plate is a reference thickness, the electrode processing units may be further configured to perform the cutting processes so that differences between consecutive ones of the gradually increasing intervals of the first electrode tabs and the second electrode tabs are a first difference. When the thickness of the first electrode plate or the second electrode plate is greater than the reference thickness, the electrode processing units may be further configured to perform the cutting processes to increase the differences between the consecutive ones of the gradually increasing intervals of the first electrode tabs and the second electrode tabs to a second difference that is greater than the first difference. When the thickness of the first electrode plate or the second electrode plate is smaller than the reference thickness, the electrode processing units may be further configured to perform the cutting processes to decrease the differences between the consecutive ones of the gradually increasing intervals of the first electrode tabs and the second electrode tabs to a third difference that is smaller than the first difference.

The system may further include thickness measuring sensor units installed at exit ports of the supplying units and configured to measure thicknesses of the first and second electrode plates supplied from the supplying units.

The system may further include thickness estimating units configured to estimate thicknesses of the first electrode plate and the second electrode plate. The thickness estimating units may include: length measuring units configured to measure lengths of the first and second electrode plates supplied from the supplying units; and thickness calculating units configured to calculate the thicknesses of the first electrode plate and the second electrode plate based on the lengths measured by the length measuring units, diameters or circumferences of mandrels or reference levels of material installed in the assembling unit for rolling the first electrode plate, the second electrode plate, and the separators or the supplying units for supplying the first electrode plate, the second electrode plate, or the separators, and numbers of windings of rolling or unrolling the first electrode plate, the second electrode plate, or the separators.

The buffer units may include: a plurality of transfer rollers configured to transfer the first and second electrode plates cut by the electrode processing units; and transfer roller driving units configured to supply the first electrode plate and the second electrode plate to the assembling unit at a constant rate by adjusting distances between the transfer rollers to extend or shorten transfer paths of the first electrode plate and the second electrode plate.

The transfer roller driving units may each include a pneumatic cylinder or a motor coupled to the transfer rollers.

According to one or more embodiments of the present invention, a system for rolling electrode plates that performs a notching process and a rolling process in a continuous mode is provided. The system can improve alignment of electrode tabs of multi-tab electrode assemblies by adjusting intervals between each of the electrode tabs according to thickness changes of the electrode plates.

BRIEF DESCRIPTION OF THE DRAWINGS

The above and other aspects and features of the present invention will become more apparent by describing in detail example embodiments thereof with reference to the attached drawings in which:

FIGS. 2A-2B are a schematic diagram illustrating a method for forming electrode tabs on an electrode plate by performing a cutting process using an electrode processing unit according to an embodiment of the present invention;

FIGS. 3A-3B are a schematic diagram illustrating a configuration and operation of a buffer unit according to an embodiment of the present invention;

FIGS. 4A-4C are a schematic diagram illustrating a method of adjusting intervals between electrode tabs according to the thickness change of an electrode plate in accordance with an embodiment of the present invention;

DETAILED DESCRIPTION

Hereinafter, examples of embodiments of the present invention will be described in detail with reference to the accompanying drawings such that they can easily be made and used by those skilled in the art. The use of the term "may," when describing embodiments of the present invention, refers to "one or more embodiments of the present invention." In addition, the use of alternative language, such as "or," when describing embodiments of the present invention, refers to "one or more embodiments of the present invention" for each corresponding item listed.

Figure 1:
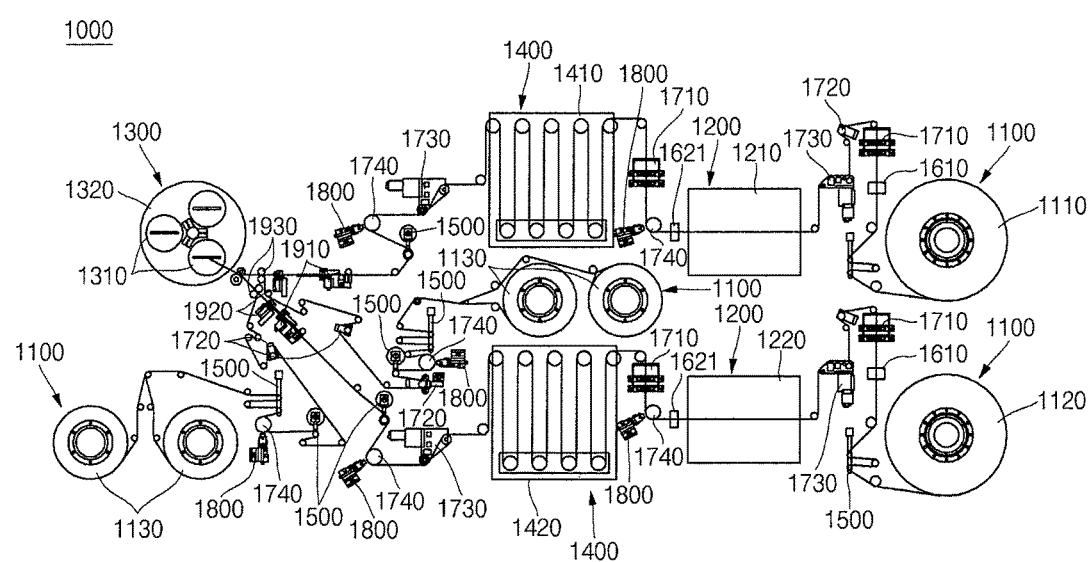
FIG. 1 is a schematic diagram illustrating a configuration of a system for rolling electrode plates according to an embodiment of the present invention.

FIG. 1 is a schematic diagram illustrating a configuration of a system 1000 for rolling electrode plates according to an embodiment of the present invention.

Referring to FIG. 1, the electrode plate rolling system 1000 includes supplying units 1100, electrode processing units 1200, an assembling unit 1300, and buffer units 1400. The electrode plate rolling system 1000 may further include tension maintaining units 1500, thickness measuring sensor units 1610 or thickness estimating units 1620 (see FIG. 5), cleaning units 1710, encoders 1720, meander correcting units 1730, driving roller units 1740, opposed sensor units 1800, insertion units 1910, cutter units 1920, and final roller units 1930.

The supplying units 1100 may supply a first electrode plate, a second electrode plate, and separators. To this end, the supplying units 1100 may include a first unwinding unit 1110 for supplying the first electrode plate, a second unwinding unit 1120 for supplying the second electrode plate, and third unwinding units 1130 for supplying the separators.

The first unwinding unit 1110 may include a spool for unwinding and supplying a reel of first electrode plate material (or base material). The second unwinding unit 1120 may include a spool for unwinding and supplying a reel of second electrode plate material (or base material). The third unwinding units 1130 may each include a spool for unwinding and supplying a reel of separator material.

The electrode processing units 1200 may form a plurality of first electrode tabs and a plurality of second electrode tabs by performing cutting processes on first sides of the first and second electrode plates (or base materials) supplied from the supplying units 1100. To this end, the electrode processing units 1200 may include a first electrode processing unit 1210 for forming the first electrode tabs on the first electrode plate and a second electrode processing unit 1220 for forming the second electrode tabs on the second electrode plate.

FIGS. 2A-2B are a schematic diagram illustrating a method for forming first electrode tabs on a first electrode plate 100 by performing a cutting process using a first electrode processing unit 1210 according to an embodiment of the present invention.

The first electrode plate 100 may be supplied to the first electrode processing unit 1210 from the first unwinding unit 1110 as illustrated in FIG. 2A. The first electrode plate 100 may include a first electrode current collector 110, a first electrode active material layer 120 (defining a coated portion of the first electrode plate), and first electrode uncoated portions 111 and 112. The first electrode current collector 110 may be formed of a metal foil, such as an aluminum foil. The first electrode active material layer 120 may be formed by coating a transition metal oxide on the first electrode current collector 110. The first electrode uncoated portions 111 and 112 may be regions of the first electrode current collector 110 on which the first electrode active material layer 120 is not formed, and may be at opposite ends or sides of the first electrode current collector 110.

The first electrode processing unit 1210 may form a first electrode plate 100a having a plurality of first electrode tabs denoted by tab11, tab12, tab13, . . . , as illustrated in FIG. 2B, separated by corresponding notching distances d11, d12, . . . , by performing a cutting process on a first end (or first side), such as the first electrode uncoated portion 111, of the first electrode plate 100. Here, the first electrode processing unit 1210 may be configured to perform the cutting process by, for example, mold notching or laser notching.

The number of turns or windings of the first electrode plate 100a increases as the first electrode plate 100a is rolled by the assembling unit 1300, which causes the circumference of the rolled first electrode plate 100a to also increase. Therefore, the first electrode tabs tab11, tab12, tab13, . . . , may not be properly aligned but instead may be obliquely laid down.

Accordingly, the first electrode processing unit 1210 may form the first electrode tabs, tab11, tab12, tab13, . . . , having the notching distances d11, d12, . . . gradually increase rather than being constant. For example, the notching distances d11, d12, d13, . . . may satisfy d11<d12<d13< . . . .

The second electrode processing unit 1220 may operate in the same or similar manner as the first electrode processing unit 1210. Accordingly, a detailed description of the operation of the second electrode processing unit 1220 will not be given. In addition, since a configuration of the second electrode plate supplied from the second unwinding unit 1120 and a method for forming second electrode tabs may be the same or similar to the configuration of the first electrode plate 100 and the method for forming the first electrode tabs tab11, tab12, tab13, . . . , detailed descriptions of the configuration of the second electrode plate and the method for forming the second electrode tabs will not be given.

However, a second electrode current collector of the second electrode plate may be formed of a different metal foil from that of the first electrode plate, such as copper or nickel foil, and a second electrode active material layer may be formed by coating, for example, graphite or carbon on the second electrode current collector.

Referring back to FIG. 1, the assembling unit 1300 may form an electrode assembly by rolling the first electrode plate 100a and the second electrode plate, which are cut by the electrode processing units 1200, together with the separators supplied from the third unwinding units 1130. To this end, the assembling unit 1300 may include a plurality of winding units 1310 and a turret 1320.

The winding units 1310 may form a reel-type electrode assembly by rolling the first electrode plate 100 a, the second electrode plate, and the separators (for example, around a mandrel). The turret 1320 may transfer the winding units 1310 positioned at different locations to corresponding process stages when the electrode assembly is formed by one of the winding units 1310.

The buffer units 1400 may be installed between each of the electrode processing units 1200 and the assembling unit 1300 to compensate for differences in processing rates and base material transfer amounts between each of the electrode processing units 1200 and the assembling unit 1300.

Since the electrode processing units 1200 may perform cutting processes when the transferred base materials are stopped, and then transfer the cut base materials to the assembling unit 1300, differences in the processing rates and the base material transfer amounts between each of the electrode processing units 1200 and the assembling unit 1300 may be created. The buffer units 1400 temporarily store appropriate amounts of the base materials of the first and second electrode plates, processed by the electrode processing units 1200 and then transmit the base materials to the assembling unit 1300 to compensate for the differences in processing rates and base material transfer amounts between each of the electrode processing units 1200 and the assembling unit 1300. Here, the base materials temporarily stored in the buffer units 1400 are supplied in appropriate amounts enough to allow the assembling unit 1300 to perform a rolling process at a constant rate.

The buffer units 1400 may include first buffer units 1410 for temporarily storing the first electrode plate (or processed base material) processed by the first electrode processing unit 1210 and second buffer units 1420 for temporarily storing the second electrode plate (or processed base material) processed by the second electrode processing unit 1220.

FIGS. 3A-3B are a schematic diagram illustrating a configuration and operating process of a first buffer unit 1410 according to an embodiment of the present invention.

As illustrated in FIG. 3A, the first buffer unit 1410 may include a plurality of transfer rollers 1411 and transfer roller driving units 1412. The transfer rollers 1411 may transfer the first electrode plate 100a cut by the first electrode processing unit 1210. The transfer rollers 1411 may include a plurality of upper transfer rollers 1411a and a plurality of lower transfer rollers 1411b. The upper transfer rollers 1411a and the lower transfer rollers 1411b may be arranged, for example, in a zigzag configuration. The first electrode plate 100a may be transferred along the upper transfer rollers 1411a and the lower transfer rollers 1411b.

The transfer roller driving unit 1412 may adjust the interval between the transfer rollers 1411a and 1411b to extend or shorten the transfer path of the first electrode plate 100a. For example, as illustrated in FIG. 3A, the transfer roller driving unit 1412 upwardly transfers the lower transfer rollers 1411 b to the interval between the upper transfer rollers 1411*a* and the lower transfer rollers 1411*b*.

In addition, when the first electrode plate 100*a* is continuously supplied to the first buffer unit 1410, as illustrated in FIG. 3B, the transfer roller driving unit 1412 downwardly transfers the lower transfer rollers 1411*b* to increase intervals between the upper transfer rollers 1411*a* and the lower transfer rollers 1411*b*, which increases the amount of the first electrode plate 100*a* stored in the first buffer unit 1410.

When the first buffer unit 1410 is continuously supplied with the first electrode plate 100*a* from the first electrode processing unit 1210 at a rate faster than the assembling unit 1300 is currently processing, the first buffer unit 1410 may temporarily store the excess supplied first electrode plate 100*a* . Then, when the first electrode processing unit 1210 stops supplying the first electrode plate 100*a* (such as during a notching operation), the assembling unit 1300 may still be continuously supplied with the stored first electrode plate 100*a* in the first buffer unit 1410.

As described above, the first buffer unit 1410 may supply the first electrode plate 100*a* to the assembling unit 1300 at a constant rate while securing a sufficient amount of the first electrode plate 100*a* to compensate for the differences in processing rates and base material transfer amount between the first electrode processing unit 1210 and the assembling unit 1300.

The transfer roller driving unit 1412 may include, for example, a pneumatic cylinder or a motor coupled to the transfer rollers 1411 to transfer the transfer rollers 1411 in up-down directions. In addition, since the second buffer unit 1420 may have the same or similar configuration as the first buffer unit 1410, a detailed description of the operation of the second buffer unit 1420 will not be given.

Referring back to FIGS. 3A-3B, the tension maintaining units 1500 are installed on base material transfer paths ranging from the supplying units 1100 to the assembling unit 1300 and maintain tensions of base materials. Here, the base materials may include the first electrode plate, the second electrode plate, and the separators, at any of their processing stages from the supplying units 1100 to the assembling unit 1300.

The thickness measuring sensor units 1610 are installed at exit ports of the supplying units 1100 and may measure thicknesses of the first and second electrode plates supplied from the supplying units 1100. The thicknesses of the first and second electrode plates may vary according to factors such as the thicknesses of the coated electrode active material layers on the base materials supplied by the supplying units 1100. For example, when the reels of electrode plates are replaced in the supplying units 1100, there may be a thickness difference between a former electrode plate and a replaced electrode plate. If there is a change in the thickness between these electrode plates, the circumference of the electrode plate rolled in the assembling unit 1300 may change. Consequently, electrode tabs may not be properly aligned, resulting in a failure in which the electrode tabs may be obliquely laid down.

Accordingly, the thickness measuring sensor units 1610 may directly measure the thicknesses of the electrode plates supplied from the supplying units 1100, and the intervals (notching distances) between each of the electrode tabs may be adjusted by the electrode processing units 1200 according to thickness changes of the electrode plates.

FIGS. 4A-4C are a schematic diagram illustrating a method of adjusting intervals between each of the first electrode tabs according to the thickness change of a first electrode plate in accordance with an embodiment of the present invention.

As illustrated in FIG. 4A, the first electrode processing unit 1210 may perform a cutting process to gradually increase intervals (notching distances) between each of the first electrode tabs tab11, tab12, tab13, . . . . Here, the first electrode processing unit 1210 may perform a cutting process on the first electrode plate 100*a* based on a first difference $\Delta d1$. That is to say, the first electrode processing unit 1210 may perform the cutting process to gradually increase the intervals between each of the first electrode tabs tab11, tab12, tab13, . . . , according to the first difference $\Delta d1$. Accordingly, the intervals between each of the first electrode tabs tab11, tab12, tab13, . . . , may be increased by $\Delta d1$ and may be defined by the following equation:

$$d1n = d11 + (n-1)*\Delta d1,$$

where n is the number of turns or windings. Here, it is assumed that there is an electrode tab every turn or winding, with the difference $\Delta d1$ representing the increase in circumference of the electrode assembly with each turn or winding of the electrode plates and separators.

However, as illustrated in FIG. 4B, when a thickness of a replaced first electrode plate 100*b*, measured by the thickness measuring sensor unit 1610, is greater than the thickness of the former first electrode plate 100*a*, the first electrode processing unit 1210 adjusts the cutting process to gradually increase intervals between each of the first electrode tabs tab21, tab22, tab23, . . . , according to a second difference $\Delta d2 > \Delta d1$. Accordingly, the intervals between each of the first electrode tabs tab21, tab22, tab23, . . . , may be increased by $\Delta d2$ and may be defined by the following equation:

$$d2n = d21 + (n-1)*\Delta d2,$$

where n is the number of turns or windings.

On the other hand, as illustrated in FIG. 4C, when a thickness of a replaced first electrode plate 100*c*, measured by the thickness measuring sensor unit 1610, is smaller than the thickness of the former first electrode plate 100*a*, the first electrode processing unit 1210 may adjust the cutting process to gradually increase intervals between each of the first electrode tabs tab31, tab32, tab33, . . . , according to a third difference $\Delta d3 < \Delta d1$. Accordingly, the intervals between each of the first electrode tabs tab31, tab32, tab33, . . . , may be increased by $\Delta d3$ and may be defined by the following equation:

$$d3n = d31 + (n-1)*\Delta d3,$$

where n is the number of turns or windings.

The first difference $\Delta d1$ may serve as a reference difference and may be smaller than the second difference $\Delta d2$ and greater than the third difference $\Delta d3$. Therefore, when the thicknesses of the electrode plates, measured by the thickness measuring sensor units 1610, are greater than the reference thickness, the electrode processing units 1200 may increase the actual difference of the intervals between each of the electrode tabs to a value greater than $\Delta d1$. However, when the thicknesses of the electrode plates, measured by the thickness measuring sensor units 1610, are smaller than the reference thickness, the electrode processing units 1200 may decrease the actual difference of the intervals between each of the electrode tabs to a value smaller than $\Delta d1$. In such a manner, the electrode processing units 1200 may adjust to changing (e.g., increasing/decreasing) differences of the intervals between each of the electrode tabs.

In the illustrated embodiment, the method for directly measuring the thicknesses of the electrode plates using the thickness measuring sensor units 1610 has been described, but aspects of the present invention are not limited thereto. Rather, the present invention may also be applied to a method for indirectly measuring (e.g., estimating) the thicknesses of the electrode plates using one or more thickness estimating units 1620 in place of the thickness measuring sensor units 1610. The thickness estimating units 1620 may estimate thicknesses of the first and second electrode plates supplied from the supplying units 1100.

Figure 5:
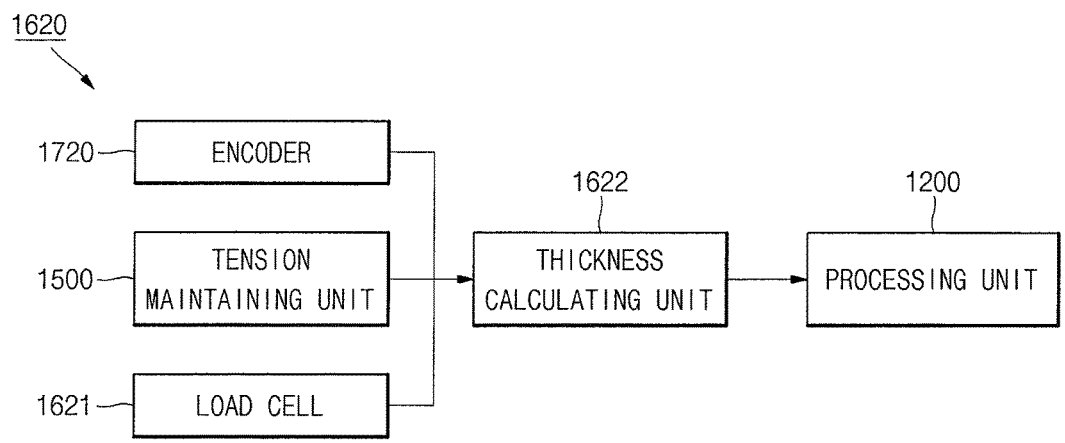
FIG. 5 is a block diagram illustrating a configuration of a thickness estimating unit according to an embodiment of the present invention.

FIG. 5 is a block diagram illustrating a configuration of a thickness estimating unit 1620 according to an embodiment of the present invention.

As illustrated in FIG. 5, the thickness estimating unit 1620 may include a length measuring unit and a thickness calculating unit 1622. The length measuring unit may measure lengths of the first and second electrode plates supplied from the supplying units 1100 using, for example, one or more of an encoder 1720, a tension maintaining unit 1500, and a load cell 1621.

The encoder 1720, which is a device for measuring a transfer amount of a base material, may calculate the number of turns of unrolling (e.g., the number of unwindings) of the transferred base material from the corresponding unwinding unit. These measurements allow the length of the base material supplied from the supplying unit 1100 to be calculated.

The tension maintaining unit 1500, which is a device for maintaining tension of the transferred base material at an appropriate level, may reversely calculate a length of the base material supplied from the supplying unit 1100 by combining the transfer amount of the base material and an angle of a dancer roller.

The load cell 1621, which is a device for measuring a weight of the transferred base material, may reversely calcuate a length of the base material supplied from the supplying unit 1100 by combining the transfer amount of the base material and a tension variation of the load cell 1621.

The thickness calculating unit 1622 may calculate the thicknesses of the first electrode plate and the second electrode plate based on inputs such as the lengths measured by the length measuring units, diameters of mandrels installed in the assembling unit 1300 for rolling the first electrode plate, the second electrode plate, and the separators and in the first, second, and third unwinding units 1110, 1120, and 1130 for unrolling the first electrode plate, the second electrode plate, and the separators, respectively, and numbers of turns (or windings) of rolling or unrolling the first electrode plate, the second electrode plate, and the separators. In place of mandrel diameters, any reference level of material on any of the reels (such as on the mandrel of the reels) may also suffice, the number of turns or windings on the reel being relative to this reference level (as opposed to an empty mandrel). The thickness calculating unit 1622 may estimate the thicknesses of the first electrode plate and the second electrode plate using the following equation:

$$2\pi r + 2\pi(r+t) + \ldots + 2\pi[r+(n-1)\,t] = L$$

where r is a radius of a mandrel (or a radius of another reference level of the reel, assuming a cylindrical mandrel or reference level; otherwise a circumference may be used in place of $2\pi r$), t is a thickness of an electrode plate, n is the number of turns or windings, and L is a length of a base material, measured by the length measuring unit. The above-described process allows the thickness of the electrode plate to be estimated after the electrode plate is subjected to a rolling or unrolling process.

Referring back to FIG. 1, the cleaning unit 1710, which is installed on a transfer path of the electrode plate, may be used in removing scraps of the electrode plate. As described above, the encoder 1720, which is installed on the transfer path of the base material and is capable of measuring the transfer amount of the base material, may be used in obtaining the length of the supplied base material. The meander correcting unit 1730, which is installed on the transfer path of the base material, may correct meandering of the base material. The driving roller unit 1740, which is installed on the transfer path of the base material, may provide a driving force for transferring the base material and may include, for example, a rotary actuator.

The opposed sensor units 1800, which are installed at, for example, exit ports of the electrode processing units 1200, the buffer units 1400, and the third unwinding units 1130, may sense intervals, for example, between each of the first electrode tabs and intervals between each of the second electrode tabs. Data sensed by the opposed sensor units 1800 may be transferred to the electrode processing units 1200 to then be used in adjusting future intervals between the electrode processing units 1200 and the electrode tabs.

The insertion unit 1910 supplies the base material to the mandrel of the assembling unit 1300, and the cutter unit 1920 cuts the base material when an electrode assembly is manufactured in the assembling unit 1300. Here, the cut base material may be supplied again to the mandrel of the assembling unit 1300 through the insertion unit 1910 to manufacture a next electrode assembly. The final roller unit 1930 may guide the electrode plate adhered to the separator to be inserted into the mandrel of the assembling unit 1300.

Figure 6:
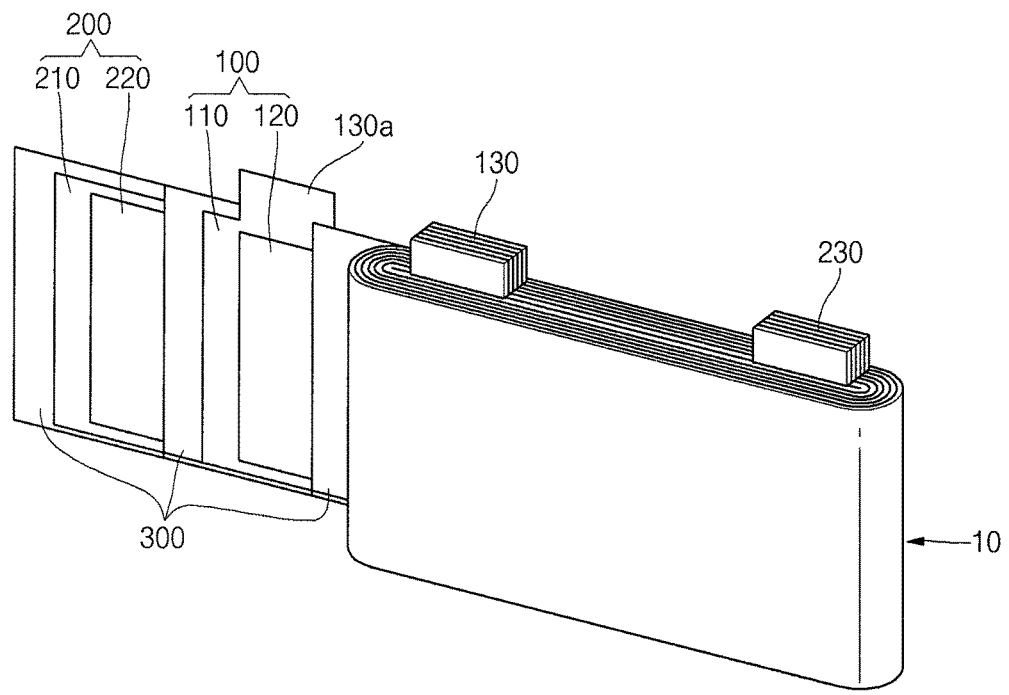
FIG. 6 illustrates an electrode assembly according to an embodiment of the present invention.

FIG. 6 illustrates an electrode assembly 10 according to an embodiment of the present invention.

As illustrated in FIG. 6, the electrode assembly 10 may include a first electrode plate 100, a second electrode plate 200, and separators 300. The first electrode plate 100 may include a first electrode current collector 110, a first electrode active material layer 120 on the first electrode current collector 110, and a first electrode tab 130a. The second electrode plate 200 may include a second electrode current collector 210, a second electrode active material layer 220 on the second electrode current collector 210, and a second electrode tab 230a. As illustrated in FIG. 6, the first and second electrode tabs 130a and 230a from each of the turns or windings may be aligned to serve as first and second multi-tabs 130 and 230 after assembly of the electrode assembly 10.

As described above, in systems for rolling electrode plates according to embodiments of the present invention, a notching process and a rolling process are performed continuously in a batch mode and the alignment of the electrode tabs in the multi-tab current collectors may be improved by adjusting intervals between each of the electrode tabs according to thickness changes of the electrode plates.

While systems for rolling electrode plates according to the present invention has been particularly shown and described with reference to example embodiments thereof, it will be understood by those of ordinary skill in the art that various changes in form and details may be made therein without departing from the spirit and scope of the present invention as defined by the following claims and their equivalents.

What is claimed is:

1. A system for rolling electrode plates, the system comprising:
   supplying units configured to supply a first electrode plate, a second electrode plate, and separators;
   electrode processing units configured to form a plurality of first electrode tabs having gradually increasing intervals between them on a first side of the first electrode plate and a plurality of second electrode tabs having gradually increasing intervals between them on a first side of the second electrode plate by performing cutting processes on the first sides of the first and second electrode plates supplied from the supplying units;
   opposed sensor units installed at exit ports of the electrode processing units and configured to sense intervals between each of the first electrode tabs and intervals between each of the second electrode tabs;
   an assembling unit configured to form an electrode assembly by rolling the first and second electrode plates cut by the electrode processing units and the separators supplied from the supplying units; and
   buffer units configured to:
      temporarily store the first and second electrode plates cut by the electrode processing units to compensate for differences in processing rates and base material transfer amounts between the electrode processing units and the assembling unit, and
      transmit the temporarily stored first and second electrode plates to the assembling unit.

2. The system of claim 1, wherein the electrode processing units are further configured to perform the cutting processes by mold notching or laser notching.

3. The system of claim 1, wherein the electrode processing units are further configured to receive data sensed by the opposed sensor units and to perform the cutting processes to adjust the gradually increasing intervals between each of the first electrode tabs and the gradually increasing intervals between each of the second electrode tabs.

4. The system of claim 1, wherein the electrode processing units are further configured to perform the cutting processes to adjust the gradually increasing intervals between each of the first electrode tabs and the gradually increasing intervals between each of the second electrode tabs according to thickness changes of the first electrode plate and the second electrode plate.

5. The system of claim 4, wherein:
   when a thickness of the first electrode plate or the second electrode plate is a reference thickness, the electrode processing units are further configured to perform the cutting processes so that differences between consecutive ones of the gradually increasing intervals of the first electrode tabs and the second electrode tabs are a first difference;
   when the thickness of the first electrode plate or the second electrode plate is greater than the reference thickness, the electrode processing units are further configured to perform the cutting processes to increase the differences between the consecutive ones of the gradually increasing intervals of the first electrode tabs and the second electrode tabs to a second difference that is greater than the first difference; and
   when the thickness of the first electrode plate or the second electrode plate is smaller than the reference thickness, the electrode processing units are further configured to perform the cutting processes to decrease the differences between the consecutive ones of the gradually increasing intervals of the first electrode tabs and the second electrode tabs to a third difference that is smaller than the first difference.

6. The system of claim 4, further comprising thickness measuring sensor units installed at exit ports of the supplying units and configured to measure thicknesses of the first and second electrode plates supplied from the supplying units.

7. The system of claim 4, further comprising thickness estimating units configured to estimate thicknesses of the first electrode plate and the second electrode plate, wherein the thickness estimating units comprise:
   length measuring units configured to measure lengths of the first and second electrode plates supplied from the supplying units; and
   thickness calculating units configured to calculate the thicknesses of the first electrode plate and the second electrode plate based on the lengths measured by the length measuring units, diameters or circumferences of mandrels or reference levels of material installed in the assembling unit for rolling the first electrode plate, the second electrode plate, and the separators or the supplying units for supplying the first electrode plate, the second electrode plate, or the separators, and numbers of windings of rolling or unrolling the first electrode plate, the second electrode plate, or the separators.

8. The system of claim 1, wherein the buffer units comprise:
   a plurality of transfer rollers configured to transfer the first and second electrode plates cut by the electrode processing units; and
   transfer roller driving units configured to supply the first electrode plate and the second electrode plate to the assembling unit at a constant rate by adjusting distances between the transfer rollers to extend or shorten transfer paths of the first electrode plate and the second electrode plate.

9. The system of claim 8, wherein the transfer roller driving units each comprise a pneumatic cylinder or a motor coupled to the transfer rollers.

* * * * *